United States Patent
Schneider (10) Patent No.: US 9,527,479 B2
(45) Date of Patent: Dec. 27, 2016

(54) PASSENGER SERVICES PROVISIONING FOR A MEANS OF TRANSPORT

(71) Applicant: Airbus Operations GmbH, Hamburg (DE)

(72) Inventor: Uwe Schneider, Jork (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 0 days.

(21) Appl. No.: 14/208,369

(22) Filed: Mar. 13, 2014

(65) Prior Publication Data

US 2014/0265476 A1    Sep. 18, 2014

Related U.S. Application Data

(60) Provisional application No. 61/781,566, filed on Mar. 14, 2013.

(30) Foreign Application Priority Data

Mar. 14, 2013   (EP) .................................... 13159282

(51) Int. Cl.
| | |
|---|---|
| *A47C 13/00* | (2006.01) |
| *B60R 99/00* | (2009.01) |
| *B64D 11/00* | (2006.01) |
| *B64D 11/06* | (2006.01) |
| *A47C 7/62* | (2006.01) |
| *A47C 7/72* | (2006.01) |

(52) U.S. Cl.
CPC ........... *B60R 99/00* (2013.01); *B64D 11/0015* (2013.01); *B64D 11/06* (2013.01); *B64D 11/0624* (2014.12); *B64D 11/0626* (2014.12); *A47C 7/62* (2013.01); *A47C 7/72* (2013.01); *A47C 13/00* (2013.01)

(58) Field of Classification Search
CPC .............. A47C 7/72; A47C 7/62; A47C 13/00
USPC ...... 297/217.1, 180.14, 217.3, 217.4, 180.13, 297/180.11, 180.1; 244/118.5
See application file for complete search history.

(56) References Cited

U.S. PATENT DOCUMENTS

| | | | |
|---|---|---|---|
| 3,019,050 A * | 1/1962 | Spielman | 297/217.3 |
| 5,267,775 A * | 12/1993 | Nguyen | 297/217.3 |
| 5,624,156 A * | 4/1997 | Leal et al. | 297/217.4 |
| 5,795,015 A * | 8/1998 | Corpe et al. | 296/214 |
| 6,899,390 B2 | 5/2005 | Sanfrod et al. | |

FOREIGN PATENT DOCUMENTS

| | | |
|---|---|---|
| DE | 102007042055 A1 | 3/2009 |
| WO | 2013/020708 A1 | 2/2013 |

OTHER PUBLICATIONS

European Patent Office, Extended European Search Report for Application No. 13159282.6, mailed Jun. 12, 2013.

* cited by examiner

*Primary Examiner* — Syed A Islam
(74) *Attorney, Agent, or Firm* — Lorenz & Kopf, LLP.

(57) ABSTRACT

A passenger seat and a passenger service supply system is provided, comprising a seat with a seating and a backrest, and a passenger service module providing a passenger service such as conditioned air, a personal light, data network access or a similar service. A passenger service module supply line is connected to the passenger service module with a first end, and comprises an interface, which is adapted to connect a second end of the passenger service module supply line to a central supply line of a means of transport. The passenger service module supply line is thereby at least partly integrated into the seating.

15 Claims, 6 Drawing Sheets

PASSENGER SERVICES PROVISIONING FOR A MEANS OF TRANSPORT

CROSS-REFERENCE TO RELATED APPLICATIONS

This application claims priority to European Patent Application No. 13 159 282.6 filed Mar. 14, 2013 and to U.S. Provisional Patent Application No. 61/781,566 filed Mar. 14, 2013, which are each incorporated herein by reference in their entirety.

TECHNICAL FIELD

The technical field relates to seats for means of transport and the supply of passenger services in a means of transport. The technical field is further related to a passenger service supply system and a means of transport comprising a passenger service supply system.

BACKGROUND

For the supply of emergency oxygen, information, personal light, conditioned air, and other passenger services for passengers of a means of transport, a passenger service channel may be provided in a passenger cabin. This passenger service channel (PSC) includes panels providing these functions and services and may further comprise infill panels without any service providing function for a better alignment within the passenger service channel. The functional panels are mounted, for instance, at the cabin ceiling under the overhead bins on a rail system, wherein the panels can be displaceable along these rails.

WO 2013/020708 A1 describes a service module for supplying passengers in a passenger space of a means of transport. The service module is arranged in a ceiling region of the passenger space and comprises at least one service component arrangement having one or more service components for individually supplying one or more passengers.

DE 10 2011 110 010 A1 describes a service system having a service channel in a ceiling region of a passenger space in a means of transport and a plurality of service modules comprising a cabin lighting unit for illuminating the passenger space of the means of transport If a cabin layout, in particular the arrangement of seats, in a means of transportation changes, also a position of corresponding PSC panels may need to be re-adjusted in regards to their position relative to the passenger to ensure access to the services by a passenger sitting in the seat below.

An arrangement of the service panels in flight direction may have to be adapted individually for each interior layout relative to a seating position of a passenger. Thereby, it may be advantageous that the passenger can comfortably reach any passenger service from his seat. Thus, for every change or modification of an interior or seating configuration within a means of transport, it may become necessary to also change the corresponding passenger service panels within the passenger service channel. Because the passenger services may need to be provided at an exactly defined position over the seat rows, also a necessary cabling and pipe supply system needs to be positioned and adapted accordingly. It may cause additional effort to adapt the PSC to a cabin layout changes.

In addition, other objects, desirable features and characteristics will become apparent from the subsequent summary and detailed description, and the appended claims, taken in conjunction with the accompanying drawings and this background.

SUMMARY

A passenger seat for a means of transport is provided, which comprises a seating, a backrest, a passenger service module, and a passenger service module supply line. The passenger service module supply line is connected to the passenger service module at a first end and to an interface, which is adapted to connect a second end of the supply line to a central supply line of a means of transport. At least a part of the passenger service module supply line and at least a part of the interface of the supply line are integrated into the seating.

An advantage can be seen in the provisioning of passenger services from the seat itself, which can make a spatially separated passenger service channel above a seat row obsolete.

A seating can be a horizontal plane or seat cushion, which serves as seating plane for one or more passengers. A seating may be arranged horizontally in relation to a cabin floor or horizontally relative to seat mounting rails of a means of transport, on which the seat is mounted. A backrest can be adapted to provide backrest space for one or more passengers. In many cases, an angular position of the backrest relative to the seating can be changed to allow a comfortable seating position of the passenger. Thereby, the seating may, furthermore, be attached to the backrest.

In an example, the passenger seat may also be an arrangement of multiple individual seats, for instance for two, for three, or for four passengers, which can each comprise separate individual passenger services modules.

A passenger service panel can be understood as a device, where multiple passenger service modules are combined.

An example can be a specific area of a rear side of a backrest, where different passenger service modules are arranged such that the passenger service panel faces a passenger sitting in a next seating row behind.

Each passenger service module can provide one specific passenger service, for instance an air outlet for conditioned air, an electric socket for data network connection, or information signs or a multimedia display. The passenger seat can also provide, for instance, multiple passenger service panels, which each comprise different passenger service modules.

The term "supply line" is referred to a transport medium, which may allow to transport different kinds of passenger services over a spatial distance within the means of transport, for instance within the cabin, within the seating and/or the backrest. Different passenger services can require different types of supply lines. For example, conditioned air is transported over a pipe system, whereas electric power supply for passenger owned devices are transported over electric cables.

The passenger service module supply line can be connected to central supply systems for various kinds of passenger services. For example, within an aircraft, a flexible air pipe can be connected to a central pipe for conditioned air as part of an air supply system of an aircraft.

The second end of the passenger service module supply line and the interface are arranged such that they can be connected with systems outside the seat. This means, that a connection or access to the passenger service module supply line is possible from the outside of the passenger seat. As an example, the interface can allow connecting different kinds of media, e.g. pipes or cables.

The term "integrated into the seating" relates to an at least partial disposal of the passenger service module supply line and/or the interface within the seating. In other words, an inner area of the seating is used to accommodate at least a part of the passenger service module supply line.

In an example, at least a part of the passenger service module supply line and/or at least a part of the interface of the supply line can be arranged below the seating. Hereby, possibly available space between the seating and the cabin floor can be used, in particular, if a thickness of the seating is too low for accommodation of air pipes and/or electric cables.

According to an example, the seating has a side portion with an outer surface defining an essentially vertical plane. The interface of the passenger service module supply line is horizontally displaceable in the vertical plane of the side portion.

An advantage can be seen in a possible flexible positioning of the interface of the passenger service module supply line over a certain length to allow different positions of the seat, whereas a position of the interface relative to a cabin wall can be maintained.

The term "horizontally" relates to an approximate horizontal extension and may slightly deviate from the horizontal position, for instance up to about +/−5°, about +/−10°, or even about +/−20°. "Essentially vertical" means that the plane may also deviate from an exact vertical position, for instance up to about +/−5°, about +/−10°, about +/−20°, or even about +/−45°.

The term "displaceable" relates to a possibility to change a spatial position of the interface, for instance through gliding, shifting, rolling or similar. This can also include a fixation and/or release mechanism for locking a certain position.

According to an example, the interface comprises a supply line connector.

An advantage can be seen in allowing a connection of the seat to central supply systems and, in particular, to bridge a spatial gap between the second end of the passenger service module supply line and the interface of a central supply line of a means of transport.

For example, a supply line connector can be an adapter. In one example, the supply line connector for conditioned air can be a tube shaped connector, which provides an air-tight connection between, for instance, a central air-condition supply system and the passenger service module supply line for conditioned air. In another example, the supply line connector is a cable or arrangement of electric cables, which provide a connection to central data network components.

In another example, the passenger service module supply line and the supply line connector can be one part. For instance, the supply line is simply extended beyond the seating and can leave the horizontal seating to connect to outside supply systems. A length of a connector can be, for example, in the range of about 20 cm to about 50 cm.

According to an example, the passenger seat further comprises a passenger service panel, which comprises the passenger service module. The passenger service panel is arranged at the rear side of the backrest and the passenger service module supply line extends in an inner area of the backrest and the seating.

An advantage can be that the passenger services are available to a person, which sits in a next seat row behind.

For example, if the passenger service panel is arranged in an upper part of the rear backrest, the passenger services are comfortably accessible to a person sitting in the next row behind.

According to an example, the passenger service module supply line comprises a flexible air pipe.

An advantage of a flexible air pipe can be that the supply line can adapt its position accordingly within the seating, if the interface is moved or shifted.

The term "flexible" relates to a deviation from straight shape, for instance, the air pipe can be bended up to, for example, about 45 degrees to about 90 degrees with a radius of, for instance, about 5 to about 20 cm. The cross-section of the flexible air pipe remains essentially stable and rigid.

In an example, the flexible air pipe can be combined in a supply arrangement, which comprises a flexible air pipe and other media, such as electric cables.

Furthermore, a passenger service supply system is proposed, which comprises a passenger seat, a cabin wall segment with an interface of a central supply line of the means of transport. The passenger seat is arranged such that a side portion of the seating faces the cabin wall segment. The interface of the central supply line is adapted for releasable connection to the interface of the passenger service module supply line.

An advantage can be seen in an advantageous arrangement of both the passenger seat and the cabin wall segment in order to provide passenger services from an interface in the wall segment directly to the passenger service module supply line within the seating. This can make the passenger service channels, as yet needed, obsolete.

A "side portion of the seating" can relate to a side plane of the seating which can be, for instance, arranged on the left or right side of the seating in flight direction. For example, when positioning a seat orthogonally to a flight direction, the side portion of the seating may also be the side portion of the seating, which is located below the backrest. In this case the rear side of the backrest faces the cabin wall and passenger service modules may be, for example, arranged in an armrest.

When the side portion of the seating faces the cabin wall segment, a distance between the interface of the passenger service module supply line and the interface of the central supply line can be minimized. This can allow short connections and short distances to be bridged for establishing a connection.

For example, the interface of a central supply line can be a socket or, in other examples, simple openings, connectors, plugs, tubes, or similar. The central supply line of the respective passenger services can be arranged and extend behind the cabin wall segment. For example, a central air supply system can extend across multiple seat rows below the floor in the cargo area of the aircraft fuselage. A separate supply pipe extends from the central air supply line to the interface in the cabin wall segment. Here it can be connected to the interface of the passenger service module supply line.

A cabin wall segment relates to an inner wall within the passenger service area of a means of transport. Such a cabin wall segment can include for instance one or more windows or window openings. A typical width of an aircraft cabin wall segment can be about 25 inches or 63.5 cm. Other examples for a central supply line can be a data network backbone, or an information and control network, for instance, to provide status information or flight attendant call services.

According to an example, the passenger service supply system further comprises a connector cover.

An advantage can be seen in a protection of the supply lines or interfaces from passenger access. Furthermore, damages through beverages or mechanical forces can be avoided.

According to an example, the cabin wall segment comprises a plurality of interfaces of a central supply line, which are arranged along a horizontal line.

For example, if sockets are chosen as interface of a central supply line, these sockets are arranged in a same height measured from the floor level. For instance, the interfaces can be distanced about 40 cm vertically from the floor.

Also certain deviations from an exact horizontal line are included, for example up to about +/−20% from an average height measured from the floor level.

According to an example, the interface of the passenger service module supply line can be displaced in the vertical plane of the seating over a maximum horizontal displacement distance. The interface of the passenger service module supply line has a horizontal extension and a maximum distance between two neighboring interfaces of the wall segment equals the maximum horizontal displacement distance of the interface of the supply line.

An advantage can be that in all possible positions of the seat in a given layout, a corresponding interface of the central supply line is available at a wall segment right opposite of the interface of the supply line of the passenger seat.

According to an example, the interfaces of the cabin wall segment are equally spaced from each other.

An advantage can be that the equal distribution of interfaces provides flexibility for any seat arrangement in a cabin. In particular, various distances are possible between seat rows while providing direct connectivity between the supply line of the passenger seat and a central supply line.

According to an example, the interface of the passenger service module supply line extends orthogonally from the vertical plane of the side portion of the seating.

An advantage can be to provide a shortest path between an interface of a central supply line in the cabin wall segment and the interface in the passenger seat. The interface or connector can be kept short to avoid access by passengers and to allow short distances between wall and seat.

Furthermore, a means of transport is proposed, comprising a passenger supply system as described above.

Means of transport may be an aircraft, such as an airplane, a helicopter or an air ship, a ship or a boat or a train, a bus or any other kind of land vehicle.

It has to be understood that features of the passenger seat as described in the above and in the following may be features of the passenger service supply system as described in the above and in the following.

If technically possible but not explicitly mentioned, also combinations of embodiments of the present disclosure described in the above and in the following may be embodiments of the passenger seat and the passenger service supply system.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1A:
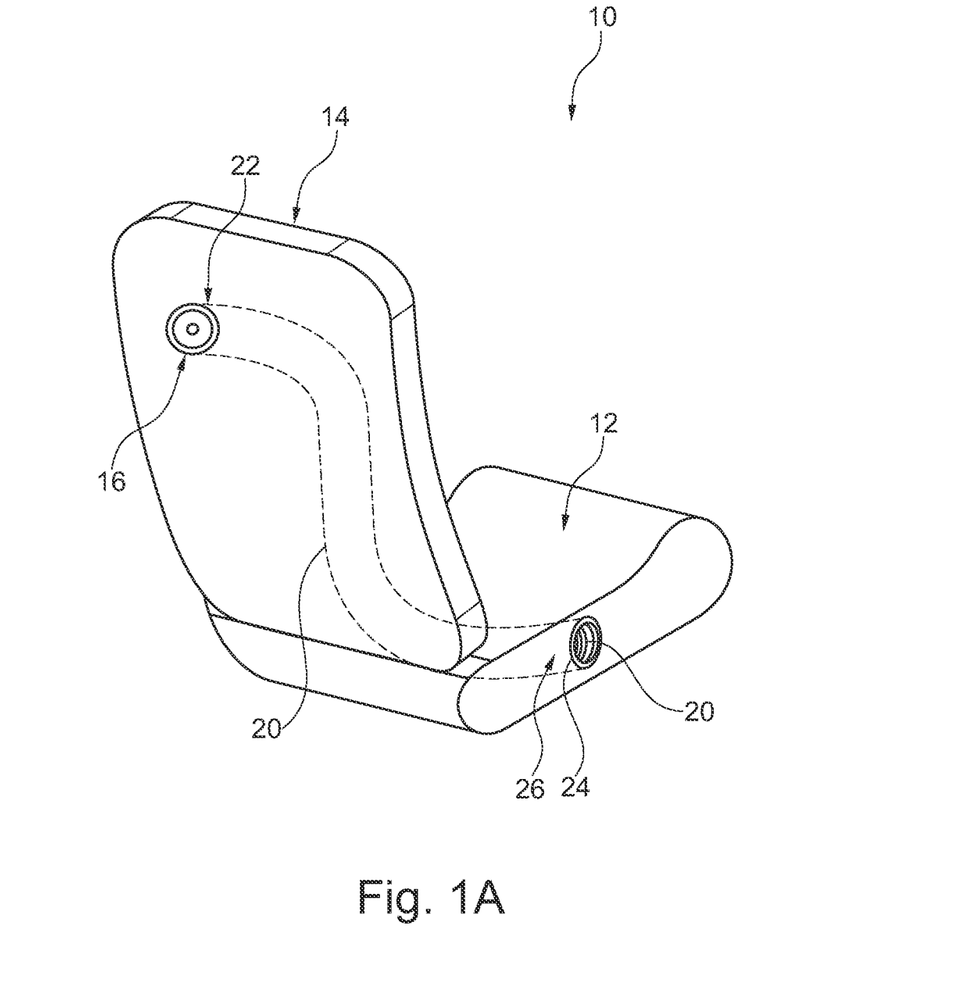
FIG. 1A shows a simplified schematic view of a passenger seat according to various embodiments.

In FIG. 1A, a passenger seat is shown with a seating 12, a backrest 14, which can be movably connected to each other. Here, an example is shown, where conditioned air is supplied through a passenger service module 16 to a passenger sitting, for instance, in a seat behind the shown seat. The passenger service module is supplied with conditioned air through a passenger service module supply line 20, which has a second end 26 positioned at a side plane of the seating 12 and connected with an interface 24. Instead of conditioned air, any other passenger service can be supplied analogously, which means, that the passenger service module 16 has to provide the respective service in an appropriate manner.

For example, the passenger service module for access to a data network can be a suitable socket instead of the shown air outlet of this example. The interface 24 and the passenger service module supply line 20 are integrated into the seating 12. The supply line 20 thereby extends from its first end 22 across the backrest 14 and the seating 12 to the second end 26 and is there connected to the interface 24. The passenger service module 16 can, in difference to the shown arrangement in the backrest 14, also be located in any other part of the backrest or any other part of the passenger seat. For example, it can be possible to dispose one or more passenger service modules in an armrest (not shown).

Figure 1B:
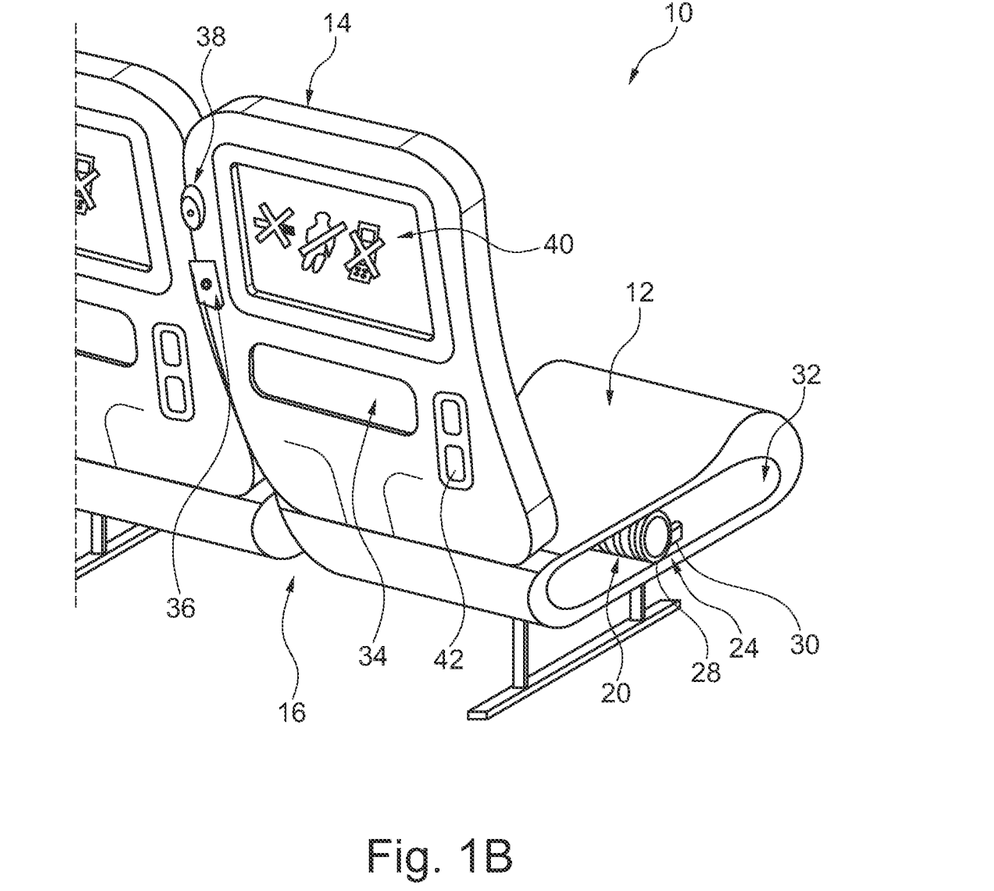
FIG. 1B shows an extended view of a passenger seat with passenger service modules according to various embodiments.

FIG. 1B shows another example of a passenger seat 10 with a seating 12, a backrest 14 and multiple passenger service modules 16. In more detail, the passenger service modules 16 comprise a passenger air outlet 36, a passenger light 38, passenger oxygen 34, passenger buttons 42, and information signs 40. All shown passenger service modules 16 are arranged on a rear side of the backrest 14. Through suitable arrangement all passenger service modules are easily accessible by a passenger sitting in a row behind the passenger seat 10. The shown passenger service modules are supplied by several passenger service module supply lines 20, which are connected to an interface of the passenger service module supply lines 24. In the shown example, an air pipe interface of the passenger service module supply line 28 and an electric interface of the passenger service module supply line 30 are shown. The arrangement of supply lines and interfaces can be displaced within a seating opening 32.

Therefore, a horizontal position of the interface of the passenger service module supply line 24 is variable on a substantially horizontal line across the opening 32 in the seating 12.

The information signs 40 can contain information about flight status, seatbelt signs, phone usage, smoking, and others. The passenger buttons 42 can allow switching of lights, flight attendant call or other functions. The passenger service module supply line 20 can also serve multiple passenger service modules for a plurality of seats, which are interconnected, as shown in FIG. 1B. The seating opening 32 can also be arranged below the backrest 14 in the seating 12.

Figure 2:
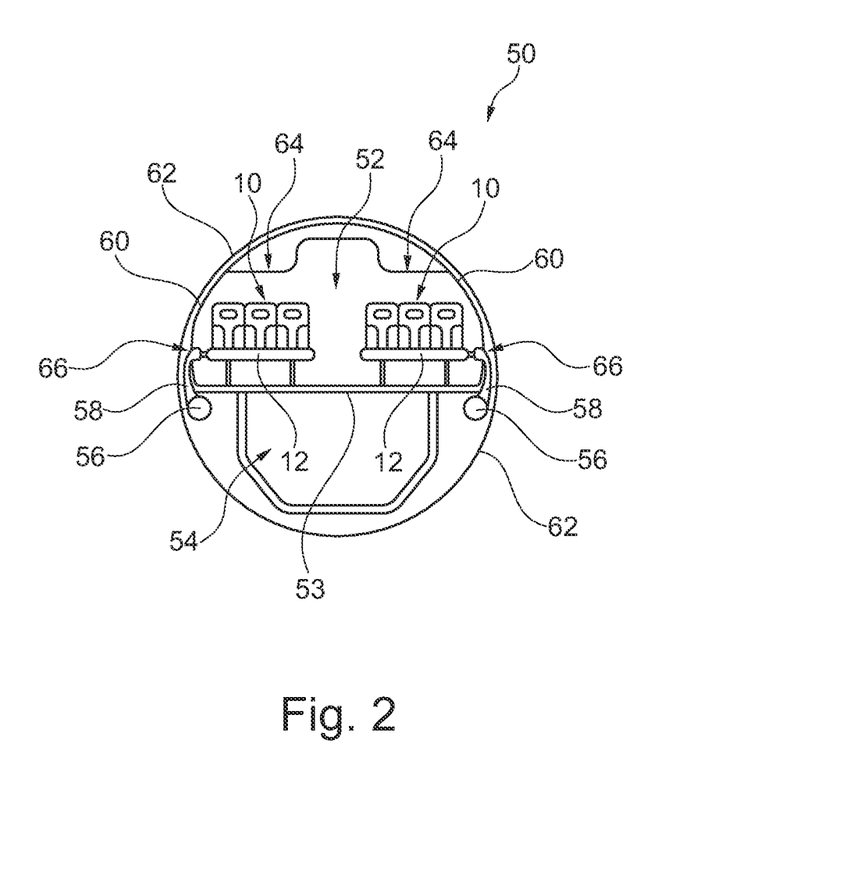
FIG. 2 shows a schematic cross-sectional view of an aircraft fuselage with two passenger seat rows according to various embodiments.

FIG. 2 shows a cross-sectional view of an aircraft fuselage 50, comprising an aircraft cabin 52, a cargo area 54, a central supply line 56, connecting branches 58 of the central supply line 56, cabin wall segments 60, an outer wall 62, and rows of overhead bins 64.

The wall segment 60 comprises several interfaces 66 of the central supply line 56, which are arranged approximately in the same height over the cabin floor 53. Each interface 66 may be connected to the central supply line via a respective connecting branch 58. As it can be seen in this example, multiple seats can be supplied with services via one interface 66 of the central supply line. The central supply line 56 is shown here as a cross-sectional view and can be provided as tube or, in case of electric services, it can be a cable channel or similar. The connecting branches 58 allow accessing the central supply line 56 for one individual seat 10 or seat row by connection through a vertical side plane of the seating 12. An advantage can be that due to their size, the central supply line 56 can be disposed, for instance in the or near the cargo area 54 or the lower part of the aircraft fuselage 50.

Figure 3:
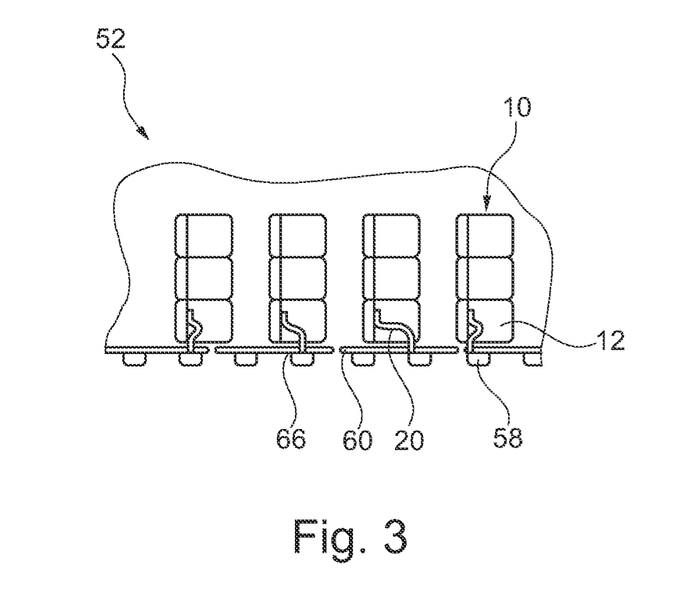
FIG. 3 shows a passenger service supply system in an aircraft cabin from a top view according to various embodiments.

FIG. 3 shows a top view of an aircraft cabin 52 with a seat 10 or a seat row, multiple seatings 12, connecting branches 58 of a central supply line 56 (not shown), several interfaces 66 of the central supply line, wall segments 60, and several passenger service module supply lines 20. The central supply line 56 (not shown) extends, for instance as an air tube or cable channel across the aircraft fuselage and may comprise vertical branches 56, which reach to an area near the seats for individual connections. The seats 10 and the wall segments are positioned close to each other to achieve short distances between the cabin wall segments 60 and the seating 12. The second end of the passenger service module supply line 20 can be displaced along a horizontal distance within the seating 12. This way, for all positions of the second end 26 of the passenger service module supply line 20 always a corresponding interface 66 of the central supply line 56 is available on the same horizontal position. Therefore, in any layout and seating configuration, a direct connection between the seat 10, in particular the passenger service module supply line 20, and the central supply line 56 can be established. In other words, the horizontal distances and positions of the interfaces 66 of the central supply line in the cabin wall segment 60 in combination with the displaceable interfaces 24 of the passenger service module supply lines may provide higher flexibility in terms of any possible cabin seating layout.

Figure 4:
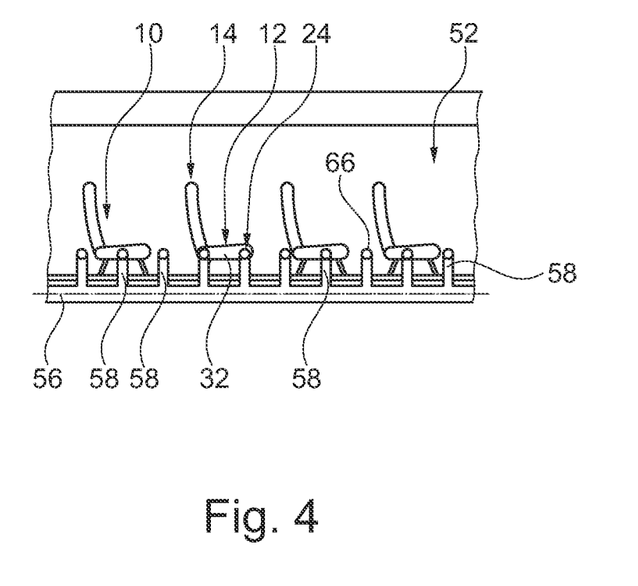
FIG. 4 schematically shows a side view of a passenger service supply system according to various embodiments.

FIG. 4 shows a vertical cross-sectional view of an aircraft cabin 52 comprising multiple passenger seats 10 with a seating 12 and a backrest 14. Furthermore, also here, a central supply line 56 with connecting branches of the central supply line 58 and corresponding interfaces 66 of the central supply line are shown. The connecting branches 58 are equally distanced from each other in a horizontal direction. Furthermore, the interface 24 of the passenger service module supply line is displaceable along the opening 32 of the seating 12. Depending on the positioning of the passenger seats 10, in particular the distance between two neighboring seats or seat rows 10, not all connecting branches 58 and interfaces 66 of the central supply line may be used. Unused interfaces 66 may be covered to be protected from damaging. The horizontal position of the interface 24 of the passenger service module supply line may vary depending on the position of the interface 66 of the central supply line and extends orthogonally to a surface of the cabin wall segment 60.

Figure 5:
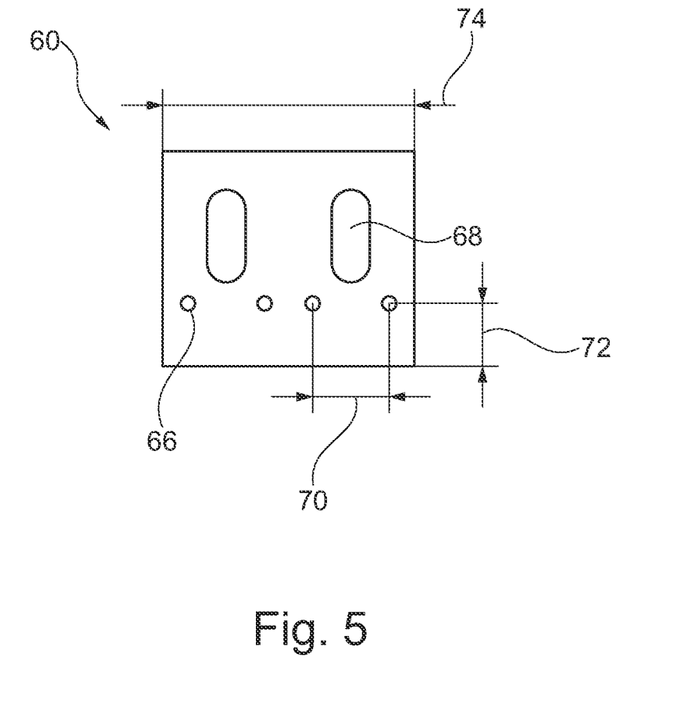
FIG. 5 schematically shows the simplified view of a wall cabin segment with interfaces according to various embodiments.

FIG. 5 shows a simplified view of a cabin wall segment 60, comprising window openings 68 and interfaces 66 of the central supply line. The interfaces 66 of the central supply line are arranged along a horizontal line with equally the same distance. The horizontal distance 70 can be, for example about 12.5 inches or 31.75 cm. A length 74 of the cabin wall segment can be about 50 inches or 127 cm. The interfaces 66 of the service supply line are, in this example, equally distanced in horizontal direction.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A passenger service supply system for a transportation means, comprising:
    a passenger seat comprising:
        a seating;
        a backrest;
        a passenger service module; and
        a passenger service module supply line, connected to the passenger service module at a first end and an interface adapted to connect a second end of the passenger service module supply line to a central supply line of a transportation means;
    a cabin wall segment having an interface of a central supply line of the transportation means,
    wherein at least a part of the passenger service module supply line and at least a part of the interface of the passenger service module supply line are integrated into the seating,
    wherein the passenger seat is arranged such that a side portion of the seating faces the cabin wall segment,
    wherein the interface of the central supply line is adapted for a releasable connection to the interface of the passenger service module supply line, and
    wherein the interface of the passenger service module supply line is displaceable in the vertical plane of the seating over a maximum horizontal displacement distance, and
    wherein a maximum distance between two neighboring interfaces of the wall segment equals the maximum horizontal displacement distance of the interface of the passenger service module supply line.

2. The passenger service supply system according to claim 1,
wherein the interface comprises a supply line connector.

3. The passenger service supply system according to claim 1, wherein the passenger seat further comprises:
a passenger service panel, which includes the passenger service module;
wherein the passenger service panel is arranged at a side of the backrest; and
wherein the passenger service module supply line extends in an inner area of the backrest and the seating.

4. The passenger service supply system according to claim 1,
wherein the passenger service module supply line comprises a flexible air pipe.

5. The passenger service supply system according to claim 1, further comprising a connector cover.

6. The passenger service supply system according to claim 1,
wherein the cabin wall segment comprises a plurality of interfaces of the central supply line, which are arranged along a horizontal line.

7. The passenger service supply system according to claim 6,
wherein the plurality of interfaces of the cabin wall segment are equally spaced from each other.

8. The passenger service supply system according to claim 7,
wherein a horizontal distance of between adjacent interfaces of the plurality of interfaces of the cabin wall segment is 31.75 cm (12.5 inches).

9. The passenger service supply system according to claim 1, wherein the passenger service module interface of the passenger service module supply line extends orthogonally from a vertical plane of the side portion of the seating.

10. A transportation means including a passenger service supply system, comprising:
a cabin wall segment with an interface of a central supply line of the transportation means; and
a passenger seat comprising:
a seating;
a backrest;
a passenger service module; and
a passenger service module supply line, connected to the passenger service module at a first end and a passenger service module interface adapted to connect a second end of the supply line to the central supply line of the transportation means;
wherein at least a part of the passenger service module supply line and at least a part of the passenger service module interface of the passenger service module supply line are integrated into the seating;
wherein the passenger seat is arranged such that a side portion of the seating faces the cabin wall segment and the passenger service module interface of the passenger service module supply line extends orthogonally from a vertical plane of the side portion of the seating;
wherein the interface of the central supply line is releasably connected to the passenger service module interface of the passenger service module supply line; and
wherein a arrangement of the supply line and the interface is displaceable within a seating opening in the seating such that a horizontal position of the interface of the passenger service module supply line is variable on a substantially horizontal line across the seating opening, and
wherein the passenger service module interface of the passenger service module supply line is movable in the vertical plane of the seating over a maximum horizontal displacement distance, and a maximum distance between two neighboring interfaces of the plurality of interfaces of the cabin wall segment equals the maximum horizontal displacement distance of the passenger service module interface of the passenger service module supply line.

11. The transportation means according to claim 10, wherein the cabin wall segment comprises a plurality of interfaces of the central supply line, which are arranged along a horizontal line.

12. The transportation means according to claim 11, wherein the plurality of interfaces of the cabin wall segment are equally spaced from each other.

13. The transportation means according to claim 10, wherein the passenger service module interface comprises a supply line connector.

14. The transportation means according to claim 10, wherein the passenger seat further comprises:
a passenger service panel, which includes the passenger service module;
wherein the passenger service panel is arranged at a side of the backrest; and
wherein the passenger service module supply line extends in an inner area of the backrest and the seating.

15. The transportation means according to claim 10, wherein the passenger service module supply line comprises a flexible air pipe.

* * * * *